(12) United States Patent
Kakehata

(10) Patent No.: US 9,975,189 B2
(45) Date of Patent: May 22, 2018

(54) SHAFT CUTTING MACHINE THAT IS ABLE TO CUT SHORT SIZE SHAFT

(71) Applicant: Thaisakol Group Co., Ltd., Bangkok (TH)

(72) Inventor: Akira Kakehata, Bangkok (TH)

(73) Assignee: THAISAKOL GROUP CO., LTD., Bangkok (TH)

( * ) Notice: Subject to any disclaimer, the term of this patent is extended or adjusted under 35 U.S.C. 154(b) by 43 days.

(21) Appl. No.: 15/111,312

(22) PCT Filed: Feb. 3, 2015

(86) PCT No.: PCT/TH2015/000005
§ 371 (c)(1),
(2) Date: Jul. 13, 2016

(87) PCT Pub. No.: WO2015/119584
PCT Pub. Date: Aug. 13, 2015

(65) Prior Publication Data
US 2016/0332243 A1 Nov. 17, 2016

(30) Foreign Application Priority Data

Feb. 6, 2014 (TH) .............................. 1401000652

(51) Int. Cl.
*B26D 7/08* (2006.01)
*B23D 47/04* (2006.01)

(52) U.S. Cl.
CPC .................................. *B23D 47/042* (2013.01)

(58) Field of Classification Search
CPC ... B23D 47/042; C07C 211/24; C07D 233/74; C07D 233/92; C07D 233/96; C07D 239/54

USPC .......................................................... 83/162
See application file for complete search history.

(56) References Cited

U.S. PATENT DOCUMENTS

| | | | | |
|---|---|---|---|---|
| 2,932,229 A | * | 4/1960 | Crane | B23D 53/04 144/3.1 |
| 4,085,638 A | * | 4/1978 | Fifer | B23D 47/042 83/150 |
| 4,130,036 A | * | 12/1978 | Thomas | B23D 45/124 82/101 |
| 4,676,132 A | * | 6/1987 | Jenkner | B23D 47/042 83/278 |
| 5,014,583 A | * | 5/1991 | Webb | B23D 47/042 83/276 |

(Continued)

FOREIGN PATENT DOCUMENTS

| | | | | |
|---|---|---|---|---|
| WO | WO 9601166 A1 | * | 1/1996 | ............. B23D 21/04 |
| WO | WO 2008155392 A1 | * | 12/2008 | ........... B23D 53/005 |

*Primary Examiner* — Ghassem Alie
*Assistant Examiner* — Bharat C Patel
(74) *Attorney, Agent, or Firm* — Womble Bond Dickinson (US) LLP

(57) ABSTRACT

Shaft cutting machine that is able to cut short size shaft composes of machine structure of which its part supporting the installing of short size shaft feeding in part. This feeding in part could fit with short size shaft in horizontal. The shaft is to be sent to rail that support the moving of shaft. This supporting rail support the mechanical pushing of short size shaft located behind moving that compose of the structure of forth-back axis be able to moving in-out for push the shaft that need to cut out by blade the short shaft that is supplied.

4 Claims, 4 Drawing Sheets

(56) References Cited

U.S. PATENT DOCUMENTS

| | | | | |
|---|---|---|---|---|
| 5,338,914 A * | 8/1994 | Omote | ............... | B23K 26/0838 |
| | | | | 219/121.67 |
| 5,559,713 A * | 9/1996 | Brown | ................ | G05B 19/4065 |
| | | | | 408/1 R |
| 5,595,462 A * | 1/1997 | Hensley | ............... | B23Q 1/0036 |
| | | | | 408/1 R |
| 6,698,159 B2 * | 3/2004 | Harris | .................... | B23D 47/04 |
| | | | | 83/247 |
| 7,001,117 B2 * | 2/2006 | Mikiya | ............... | B23B 31/1071 |
| | | | | 408/135 |
| 7,313,896 B2 * | 1/2008 | Griggs | ................. | A22C 11/125 |
| | | | | 29/243.56 |
| 7,849,776 B2 * | 12/2010 | Hilgendorf | ............ | B26D 1/157 |
| | | | | 414/412 |
| 2014/0360324 A1 * | 12/2014 | Tokiwa | ................. | B23D 53/04 |
| | | | | 83/23 |

* cited by examiner

SHAFT CUTTING MACHINE THAT IS ABLE TO CUT SHORT SIZE SHAFT

TECHNICAL FIELD

Engineering related to shaft cutting machine that is able to cut short size shaft

BACKGROUND ARTS

Shaft cutting machine in the market is composed of attached plate of which its one size is holder of shaft which is could hold shaft when the shaft is in desired range or release the holding when the shaft is being cut for adjust the length of axle again. This type of said machine is controlled by manual that to be use the expertise of technician in adjusting the length of shaft to be cut.

CHARACTERISTICS AND PURPOSE OF THE INVENTION

Shaft cutting machine that is able to cut short size shaft composes of machine structure of which its part supporting the installing of short size shaft feeding in part. This feeding in part could fit with short size shaft in horizontal. The shaft is to be sent to rail that support the moving of shaft. This supporting rail support the mechanical pushing of short size shaft located behind moving supporting rail and available for installing with driving mechanism with driving motor. The driving motor is to transmit the power to move motor axle move in-out and push the shaft that needed to cut out by the needed length. The cutting process is made by blade which is a part of cutting module and work against the short shaft that is supplied to the front of shaft moving supported rail.

The purpose of this invention is to have shaft cutting machine that could be able to cut short size shaft, reducing material lost which may occur when the shaft could not be cut because it is not long enough to cut by other machine. The short size shaft needed to cut is to send through short size shaft supply unit according to this invention to be cut by the blade of this machine.

DISCLOSURE OF INVENTION

Figure 1:
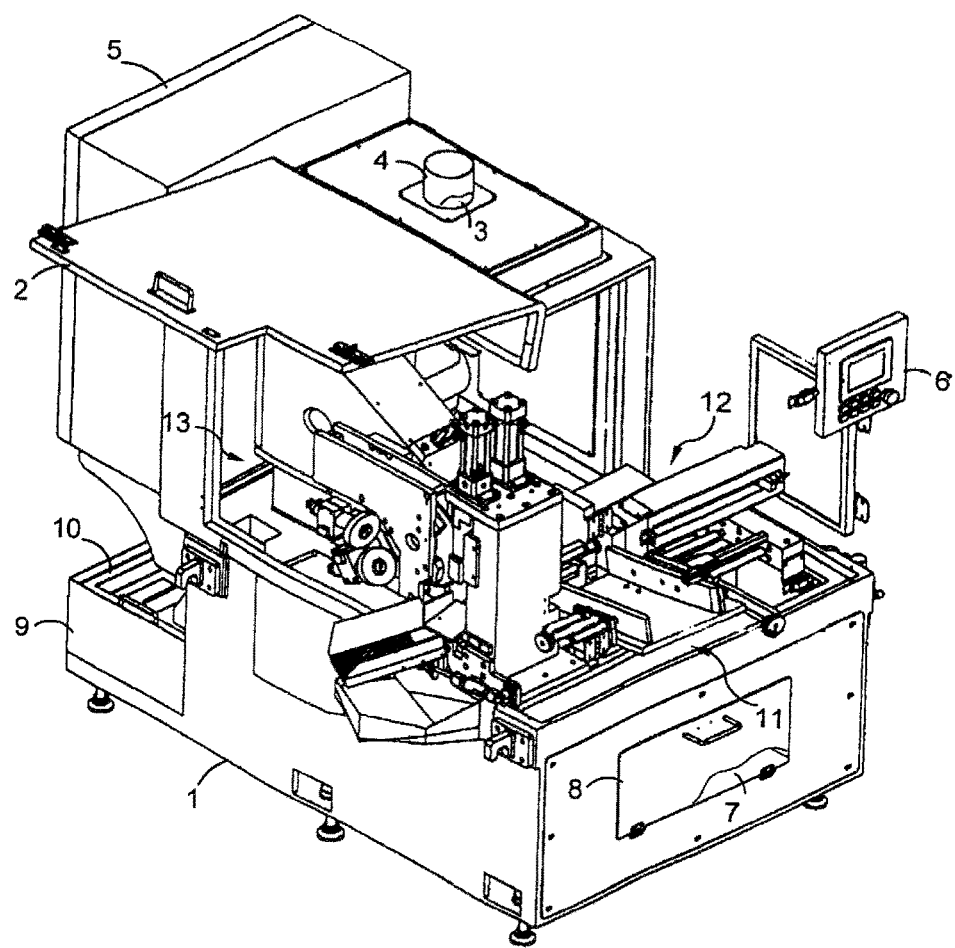
FIG. 1 shows shaft cutting machine that is able to cut short size shaft according to this invention.
Figure 2:
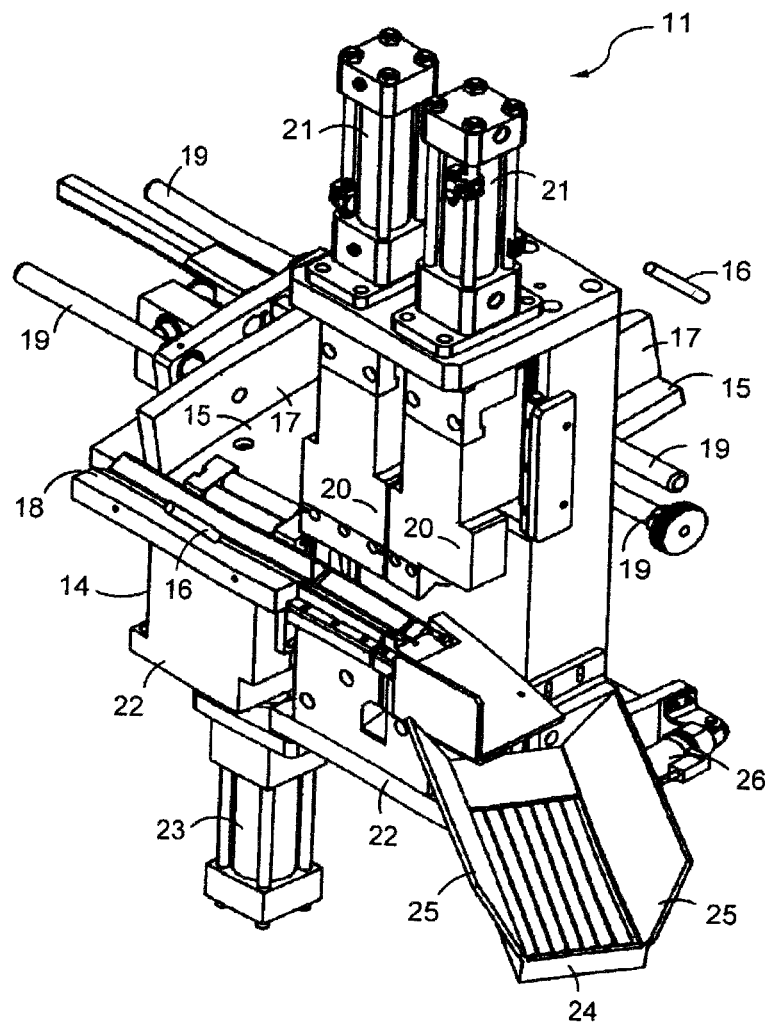
FIG. 2 shows short size shaft feeding in support unit of shaft cutting machine that is able to cut short size shaft according to this invention.
Figure 3:
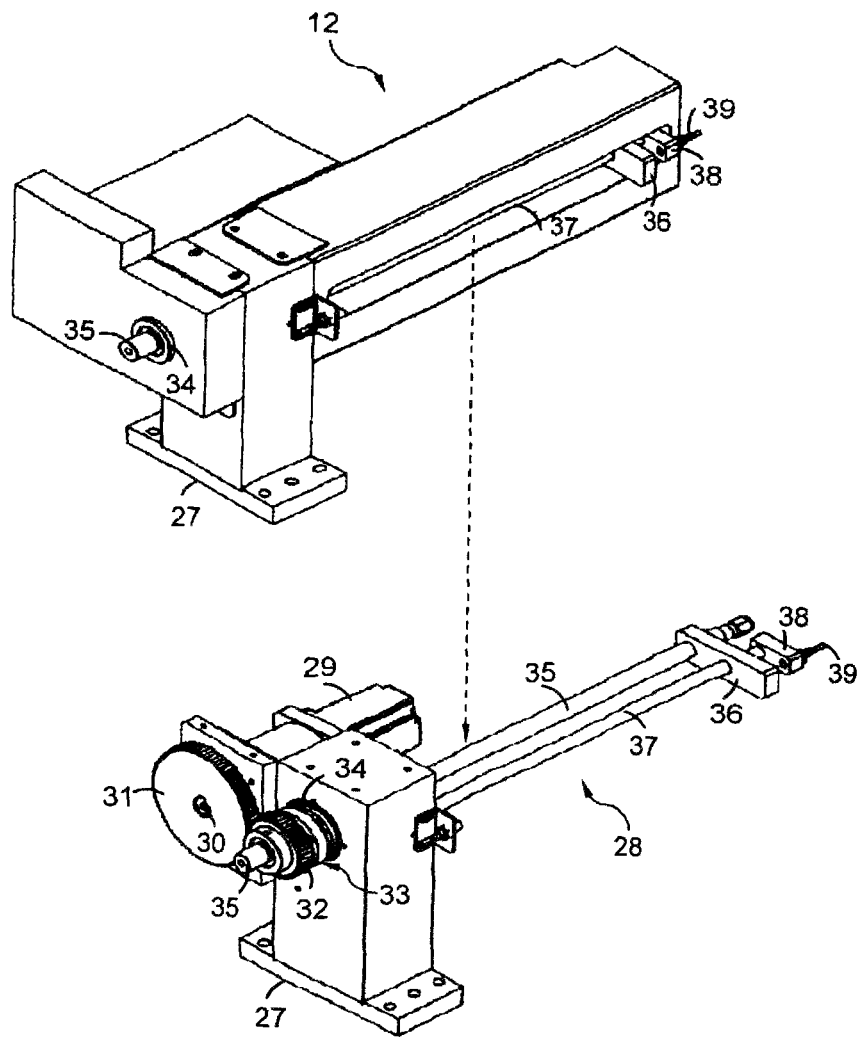
FIG. 3 shows short size shaft feeding in unit of shaft cutting machine that is able to cut short size shaft according to this invention.
Figure 4:
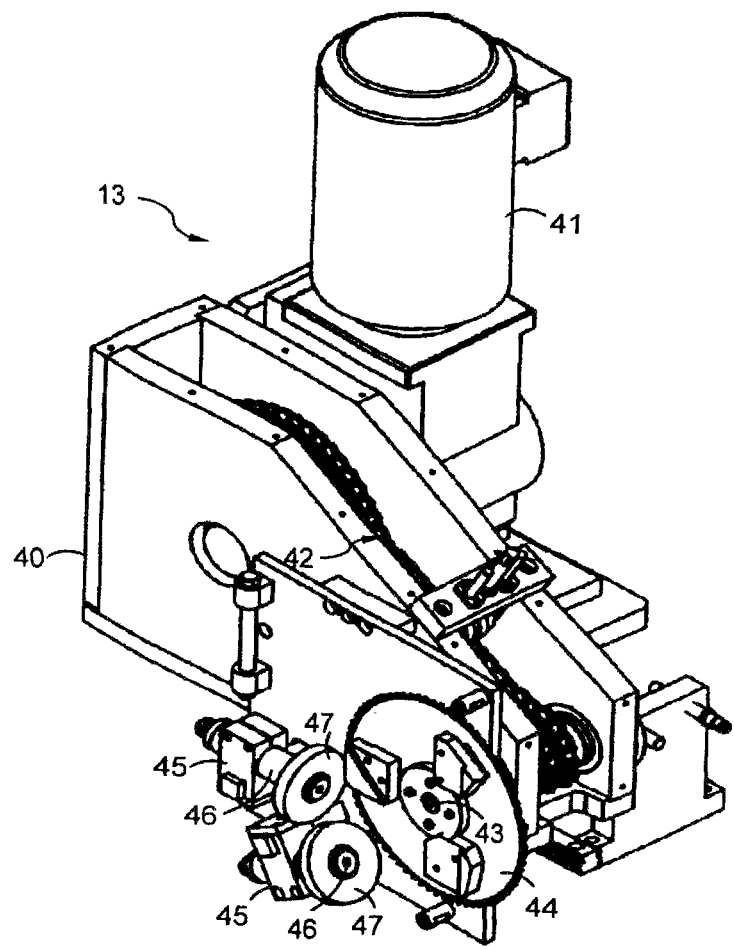
FIG. 4 shows short size shaft cutting unit that cut the feeding shaft 13 of shaft cutting machine that is able to cut short size shaft according to this invention.

According to picture 1, it shows shaft cutting machine that is able to cut short size shaft according to this invention. The machine composes of machine structure 1 which is built up from post or metal sheet formed up as structure of the shaft cutting machine, which Beside of machine structure, at whichever side, it is open-close frame 2 which is structure built up from post or metal sheet formed up as structure that is able to open-close with the hollow of shaft cutting machine to open-close the hollow of the machine which equipped with outside components, and Part of upper side of machine structure 1, there is air passage 3 that flow out the air directly or through connected tube 4 to flow out the air from working process of shaft cutting machine inside machine structure 1 to outside, and Beside of the machine structure 1, at whichever sides, there is electric controller unit 5 equipped for being electricity system and bridge between outside electric source and electricity system in shaft cutting unit, and Part of machine structure 1, there is controller 6 installed, or using as electric controller that control electricity system and usage of shaft cutting machine, and Lower part of machine structure 1, there is scrap box 7 with box lid 8 which could open-close for receiving and storing shaft scrap from the cutting process, and At the other side on the lower part of machine structure 1, there is coolant reservoir 9 of which its upper part of hole connected with filter 10 for receiving and storing coolant, and Part of beside of machine structure 1, there is short shaft feeding unit 11 (shown in picture 2) for sending short shaft to cutting supply unit 12 (shown in picture 3) to cut the short shaft by shaft cutting unit 13 (shown in picture 4)

According to picture 2, it shows short shaft feeding unit 11 of shaft cutting machine which could cut short size shaft according to this invention. The unit composes of feeding in structure 14 which are posts or sheets forming up as main structure of feeding in structure 14, which A part of feeding in structure 14, there contains of shaft pallet 15 which is pallet for placing horizontal laid short shaft 16 that needed to be cut. The left or right side of shaft pallet 15 is attached with side edge 17 as side edge. The edge help preventing horizontal laid short shaft 16 while it is on shaft pallet 15 to be on the right track on moving horizontal laid short shaft 16 to shaft moving rail 18, or Side edge 17 is able to be adjusted by moving edge in-out stick 19 with the external force that makes edge in-out stick 19 moving in-out to adjust the length of space between side edge 17 to fit with the length of short size shaft that is placed on horizontal laid short shaft 16 on shaft pallet 15. It helps moving horizontal laid short shaft 16 to be on shaft moving rail 18 as the same, and Above of shaft moving rail 18, there is upper up-down moving pallet 20 which is top pallet or top structure of which its part is attached to part of top structure of feeding in structure 14. This is for receiving the transmission of force from upper in-out cylinder 21 to transmit the power to be able to move upper up-down moving pallet 20 on the top, and The lower part of shaft moving rail 18 composes of lower up-down moving pallet 22 which is lower pallet or lower structure of which its part is attached to part of top structure of feeding in structure 14. This is for receiving the transmission of force from lower in-out cylinder 23 to transmit the power to be able to move lower up-down moving pallet 22 at the lower part, and At front of shaft moving rail 18, there is finished shaft pallet 24 with the side edge 25 to receive finished cut shaft with the desired length, and At side of finished shaft pallet 24 or side of side edge 25, there contains of one end of side rocker arm 26 of which its another end is attached with machine structure 1 for rocking finished shaft pallet 24 moving forth-back as desire.

According to picture 3, it shows cutting supply unit 12 of shaft cutting machine is able to cut short size shaft according to this invention. The unit composes of shaft feeding structure 27 that is the outer structure with its lower part or part of structure attached to part of machine structure 1 that located behind shaft moving rail 18 of short shaft feeding unit 11 for supporting the installation of short shaft driving mechanism 28, which Short shaft driving mechanic 28 composes of driving motor 29 of which its part is attached to shaft feeding structure 27 for supporting electricity transmission from outside to drive motor axle 30 working, which Motor axle 30 is to be attached with driving pinion 31 for driving with transmitted driving pinion 32 that places on a part of driving set 33 which is installed with a part of shaft feeding structure 27, which Driving set 33 is the mechanic that supported the driving and is attached with transmitted driving pinion 32. Another part of the set is attached with shaft feeding structure 27 directly or attached through supported bearing 34 which is installed with part of shaft feeding structure 27 for insertion of forth-back axis 35, which Forth-back axis 35 is long axis that inserts in the inner side of driving set 33 for moving in-out from transmission force from driving set 33 to push short size shaft that is placed on horizontal laid short shaft 16 on shaft moving rail 18 to be on cutting process at the desired length by shaft cutting unit 13, and The back of forth-back axis 35 attaches with part of back holding stick 36 for moving forth-back along with the moving forth-back of forth-back axis 35, while back end of forth-back support stick 37 inserting through, which Forth-back support stick 37 is long stick of which its front end attaches with part of shaft feeding structure 27, and its back end inserting through part of back holding stick 36 for holding with end sticking stick 38 with end detecting stick 39 holding, which End detecting stick 39 is stick or detecting structure for touching with part of shaft feeding structure 27, while end detecting stick 39 moves to press with part of shaft feeding structure 27 for sending processing data to unit control of shaft cutting machine to stop the operation of driving motor 29.

According to picture 4, it shows shaft cutting unit 13 of shaft cutting machine is able to cut short size shaft according to this invention. The unit composes of shaft cutting unit structure 40 that is the outer structure for attached as one with machine structure 1, which Beside of shaft cutting unit structure 40 contains of side driving motor 41, operating by electricity transmitted from outside for driving the driving axle of motor transmitting the power to power transmission mechanism 42, which Power transmission mechanism 42 composes of driving pinion or driving gear, transmitting power by chain or cog belt to blade axis 43 with shaft blade 44 attached with to cut horizontal short shaft 16 which is placed on shaft moving rail 18 by the desired length, and Another part of beside of shaft cutting unit structure 40, there contains of side axle holding base 45 at least one holding base. The base is inserted by one side of side rolling axle 46 which receiving the power transmitted from outside.

The other side of axle inserts with hone wheel 47 which rolling along with the rolling of side rolling axle 46 to hone the surface of cut shaft.

BEST MODE FOR CARRYING OUT THE INVENTION

As the same as mentioned in Disclosure of Invention.
The invention claimed is:
1. A shaft cutting machine for cutting a short size shaft comprising:
  a machine structure (1) having at one side a frame (2) which opens and closes for accessing the shaft cutting machine;
  at an upper side of said machine structure (1), an air passage (3) which removes air from inside the machine structure directly or through a tube (4) connected to a space external to said machine structure;
  an electric controller unit (5) which connects said external electric source to an electrical system disposed within said shaft cutting machine;
  a control panel (6) connected to said electric controller unit that controls said electrical system and usage of said shaft cutting machine;
  a scrap box (7) disposed at a lower part of said machine structure (1) with a box lid (8) which opens and closes for receiving and storing shaft scrap from a cutting process;
  a coolant hole (9) disposed at a side of the lower part of machine structure (1) having an upper part connected with a filter (10) for receiving and storing coolant;
  a short shaft feeding unit (11), including:
  a feeding in structure (14) including a shaft pallet (15) having a side edge (17) with an adjustable space for placing a horizontally laid short shaft (16) on a shaft moving rail (18);
  an upper up-down moving pallet (20) disposed above said shaft moving rail (18), which is attached to a top portion of said feeding in structure (14) for receiving a transmission of force from an upper in-out cylinder (21) to transmit power for moving said upper up-down moving pallet (20) up and down;
  a lower part of the shaft moving rail (18) including a lower up-down moving pallet (22) which is attached to said top portion of said feeding in structure (14) for receiving the transmission of force from a lower in-out cylinder (23) to transmit power for moving said lower up-down moving pallet (22) up and down;
  a shaft cutting unit (13) including a shaft cutting unit structure (40) integrally attached to said machine structure (1);
  a finished shaft pallet (24) disposed at a front of said shaft moving rail (18), with a side edge (25) which receives a finished cut shaft with a desired length produced by said shaft cutting unit (13),
  said shaft cutting unit structure (40) having a side driving motor (41), operated by electricity transmitted from said external source for driving the driving axle of a motor transmitting the power to a power transmission unit (42) which drives a blade axis (43) having a shaft blade (44) for cutting said horizontally laid short shaft (16) to a desired length;
  said shaft cutting unit structure (40), further including a first and second side axle holding base (45) into which is inserted at one side a side rolling axle (46) which receives power transmitted from said external source, and at an opposite side of said side rolling axle a honing wheel (47) which rotates along with a rotation of said side rolling axle (46);
  wherein said horizontally laid short shaft (16) is pushed by a cutting supply unit (12) which includes a shaft feeding structure (27) attached to said machine structure (1) for supporting an installation of a short shaft driving mechanism (28), which
includes a driving motor (29) to drive a motor axle (30), said motor axle (30) attached with a driving pinion (31) for driving with a transmitted driving pinion (32) placed on a driving set (33) which is installed with said shaft feeding structure (27); wherein said driving set (33) is a mechanism that supports the driving and is attached to the transmitted driving pinion (32) and said shaft feeding structure (27) directly or through supported bearing (34) which is installed with said shaft feeding structure (27) for insertion of a forth-back axis (35);
wherein said forth-back axis (35) is a long axis that is inserted in an inner side of said driving set (33) for moving a transmission force in and out from the driving set (33) to push the horizontally laid short shaft (16) on the shaft moving rail (18) to cause said shaft cutting unit (13) to cut said shaft to said desired length.

2. The shaft cutting machine according to claim 1, wherein a back portion of said forth-back axis (35) is attached with a back holding stick (36) for moving forth-back along with the moving forth-back of said forth-back axis (35), while a back end of a forth-back support stick (37) is inserted therethrough,
wherein said forth-back support stick (37) is long stick having a front end attached to said shaft feeding structure (27), and a back end which is inserted through said back holding stick (36).

3. The cutting machine according to claim 2 wherein said back end of said forth-back support stick (37) is attached with an end sticking stick (38) with an end detecting stick (39) holding said shaft feeding structure (27), while said end detecting stick (39) moves to press with said shaft feeding structure (27) for sending processing data to said controller unit to stop the operation of said driving motor (29).

4. The cutting machine according to claim 2 wherein said back end of said forth-back support stick (37) is attached with an end sticking stick (38) with an end detecting portion (39) holding said shaft feeding structure (27), while said end detecting stick (39) moves to press with said shaft feeding structure (27) for sending processing data to said controller unit to stop the operation of said driving motor (29).

* * * * *